United States Patent
Kishida

(10) Patent No.: US 7,363,623 B2
(45) Date of Patent: Apr. 22, 2008

(54) SERVICES OF REMOTE SOFTWARE INSTALLATION, CONFIGURATION AND AFTERWARD SUPPORT, FOR NETWORK CONNECTED PERIPHERALS

(75) Inventor: Akira Kishida, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/912,473

(22) Filed: Aug. 5, 2004

(65) Prior Publication Data

US 2006/0031832 A1 Feb. 9, 2006

(51) Int. Cl.
*G06F 9/445* (2006.01)

(52) U.S. Cl. ............. 717/174; 717/175; 717/176; 717/177; 717/178

(58) Field of Classification Search ........ 717/168–178; 705/26–27; 726/14–15
See application file for complete search history.

(56) References Cited

U.S. PATENT DOCUMENTS

| | | | |
|---|---|---|---|
| 5,421,009 A | 5/1995 | Platt | |
| 5,555,416 A | 9/1996 | Owens et al. | |
| 5,805,897 A | 9/1998 | Glowny | |
| 5,809,251 A | 9/1998 | May et al. | |
| 5,859,969 A | 1/1999 | Oki et al. | |
| 5,860,012 A | 1/1999 | Luu | |
| 5,870,610 A | 2/1999 | Beyda | |
| 5,923,885 A | 7/1999 | Johnson et al. | |
| 5,999,741 A | 12/1999 | May et al. | |
| 6,138,153 A | 10/2000 | Collins, III et al. | |
| 6,269,481 B1 | 7/2001 | Perlman et al. | |
| 6,301,012 B1 | 10/2001 | White et al. | |
| 6,301,707 B1 | 10/2001 | Carroll et al. | |
| 6,324,690 B1 | 11/2001 | Luu | |
| 6,424,950 B1 | 7/2002 | Weller | |
| 6,442,683 B1 | 8/2002 | Fleming, III | |
| 6,457,076 B1 | 9/2002 | Cheng et al. | |
| 6,523,166 B1 | 2/2003 | Mishra et al. | |
| 6,530,018 B2 | 3/2003 | Fleming, III | |
| 6,542,943 B2 | 4/2003 | Cheng et al. | |

*Primary Examiner*—William Wood
(74) *Attorney, Agent, or Firm*—Canon U.S.A. Inc. IP Division

(57) ABSTRACT

A method and system for installing and configuring software for a peripheral device from a remote location to a user's computer. The method and system comprise connecting to an Internet site via a client device, selecting an item displayed on the Internet site, providing at least one location where the item can be obtained, wherein the at least one location is remote from the client device's location and the item is situated at the at least one location, establishing a temporary secure connection between the client device and the at least one location, installing and configuring software on the client device from the least one location via the temporary secure connection, and controlling the item from the at least one location via the software installed and configured on the client device.

20 Claims, 5 Drawing Sheets

SERVICES OF REMOTE SOFTWARE INSTALLATION, CONFIGURATION AND AFTERWARD SUPPORT, FOR NETWORK CONNECTED PERIPHERALS

BACKGROUND OF THE INVENTION

1. Field of the Invention

The present invention relates to a method and system for remote installation and configuration of software for a peripheral device, more particularly, to a method and system for installation and configuration of software for a peripheral device from a remote location.

2. Description of the Related Art

With the purchase of a new peripheral device, such as a printer, scanner, facsimile machine, or multi-function machine, users are faced with a problem of installing drivers and utility software on the computer to be connected to the peripheral device for the peripheral device to run properly. A general installation process involves the user connecting the peripheral device to the computer or a computer network with multiple computers, and installing the appropriate drivers and software. The drivers are either loaded from a recording medium (i.e., compact disc) that came with the peripheral device, discovered in the computer's driver library, or loaded from the peripheral device's manufacturer's website. This manual process of installing drivers can present difficulties for a user who is unfamiliar with the installation of peripheral devices.

Currently, in the case where drivers are provided with the peripheral device, various other software programs are bundled with the drivers, where these other programs provide additional features that can be used with the peripheral device, but are not necessary for the installation of the peripheral device. A user must determine from amongst the programs which ones are essential and which ones are not. Once that determination is made, and the software installation is complete, the software must be configured correctly in order to maximize the use of the peripheral device. Take for example a scanning device, where the typical function is to scan documents. A user might consider installing additional software such as an optical character recognition application, which converts scanned documents into text, enabling the user to edit the scanned document.

In addition to the difficulties encountered when installing the drivers and additional software, if the installation is performed using a recording medium provided with the peripheral device, or from the computer's driver library, the drivers and additional software are typically out-of-date. Drivers and software are constantly being updated to correct errors and/or improve performance issues. Unless a user loads the drivers and additional software from the manufacturer's website, the user typically loads out-dated drivers and additional software and is unaware of there are newer versions available. Generally, a user wants to install the drivers and software and get the peripheral device functioning properly immediately, without the trouble of spending additional time searching for updated drivers or software.

One current typical scenario to overcome the foregoing problems is for a user to have a qualified computer technician install and configure the peripheral device. However, this results in a user incurring additional costs (i.e., paying the technician's fee), as well as time. In a different attempt to over come the foregoing problems, device manufacturers have introduced an automatic installation service, wherein a user installs a software program on the user's computer that will automatically install driver and software programs from a remote server. This process, however, still leaves the possibility of a faulty installation and configuration.

Given the problems associated with installation and configuration of peripheral devices, what is needed is a new service for remotely installing and configuring drivers and software, where a qualified computer technician remotely installs and configures the peripheral device, leaving a user to only have to connect the peripheral device to the user's computer or network.

SUMMARY OF THE INVENTION

The forgoing problems are addressed by a method and system for remote installation and configuration of software for a peripheral device. More specifically, a local vendor remotely installs and configures the software for a peripheral device onto a user's local computer.

In one aspect of the present invention, a user connects to a vendor's website via an Internet browser on a client device, i.e., the user's computer. The user selects a desired peripheral device from the vendor's website, wherein the vendor's website provides a local physical location of the vendor that has the selected peripheral device in stock. The client device establishes a temporary virtual private network (VPN) connection to the local vendor. The user visits the local vendor, where a computer technician connects the selected peripheral device to the local vendor's network. A remote desktop software application is launched from the local vendor's network enabling the computer technician to control the client device via the VPN connection. The computer technician then proceeds to install and configure the peripheral device's driver onto the client device via the remote desktop software application. The selected peripheral device is accessed from the remote client device, enabling the computer technician to demonstrate to the user how the peripheral device works with the client device. Based on this demonstration, the user decides whether or not to purchase the selected peripheral device. If the user purchases the peripheral device, all that is left for the user to do is to physically connect the peripheral device with the client device without the need for any additional software installation or configuration.

The present invention makes it very convenient for a user to test the functionality of the selected peripheral device with their client device from a remote location, before deciding to purchase the selected peripheral device. A more complete understanding of the invention can be obtained by reference to the following detailed description of the preferred embodiment(s) thereof in connection with the attached drawings.

DETAIL DESCRIPTION OF THE INVENTION

The invention is described by way of a preferred embodiment, and it is understood that the description is not intended to limit the invention to those embodiments, but is intended to cover alternatives, equivalents, and modifications such as are included within the scope of the appended claims.

Figure 1:
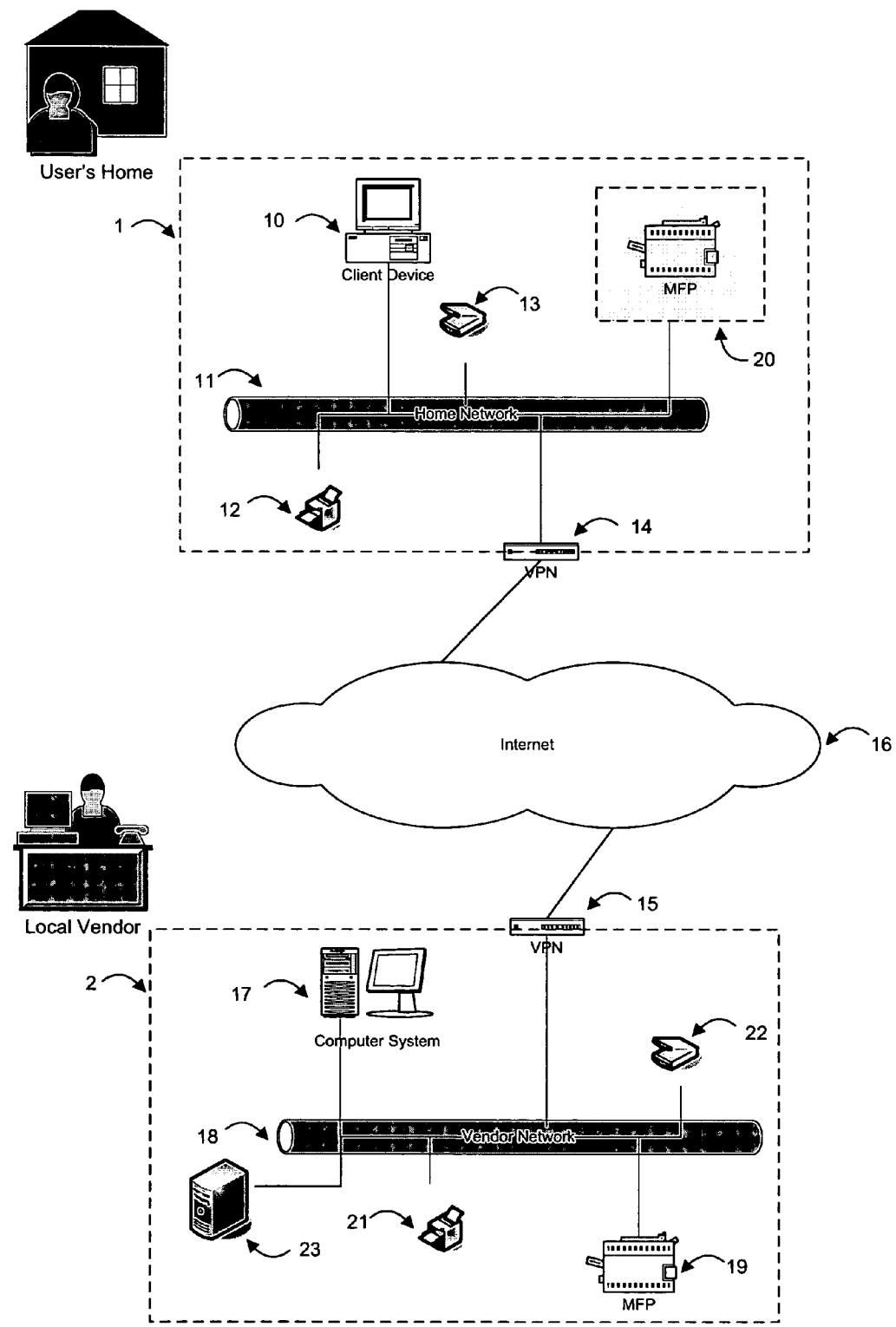
FIG. 1 is a representation view of the general configuration of the entire system.

FIG. 1 is a representational view of an entire system for installation and configuration of software for a peripheral device from a remote location to a user's computer. User's environment 1 includes client device 10, peripheral devices 12, 13, 20, virtual private network (VPN) 14, and network 11. The example used to depict user's environment is a user's home, however, any location that would enable practice of the present invention is applicable. Client device 10 is preferably a personal computer, and is connected to peripheral devices 12, 13, 20, and VPN 14 via network 11. In another embodiment, client device 10 can be connected to peripheral device 12, 13, 20 and VPN 14 via interface cables (e.g., USB cable).

Network 11 can be a variety of different types of networks including, but not limited to, a wireless network, an Intranet, a local area network (LAN), or a wide area network (WAN). Peripheral devices 12, 13, 20 can include, but are not limited to, a printer, scanner, facsimile machine, multi-function device, digital camera, video camcorder, or personal digital assistant (PDA).

VPN 14 is a system for securing communications between computers over an open network such as the Internet 16. By securing communications between computers, the computers are linked together as if they were on a private local area network (LAN). This effectively enables remote computers to securely communicate with one another without the infrastructure cost of constructing a private network. As a result, physically separate LANs can work together as if they were a single LAN, and remote computers can be temporarily connected to a LAN for communications without the risks inherent in using an open network.

Local vendor 2 contains vendor computer 17, server 23, VPN 15, peripherals 19, 21, 22, and network 18. Vendor computer 17, server 23 VPN 15, and peripherals 19, 21, 22 are all connected via network 18. Network 18 and VPN 15 are similar to the network 11 and VPN 14, but are located at local vendor 2. Network 11 and network 18 establish a connection via the Internet 16 using VPN 14, 15.

Peripheral device 20 is depicted as being connected to network 11, but is actually peripheral device 19 on network 18. Peripheral device 20 appears to be on network 11, even though it is physically installed on the local vendor network 18, by installing the driver and applicable software onto client device 10 via VPN connection 14, 15 as described below.

Figure 2A:
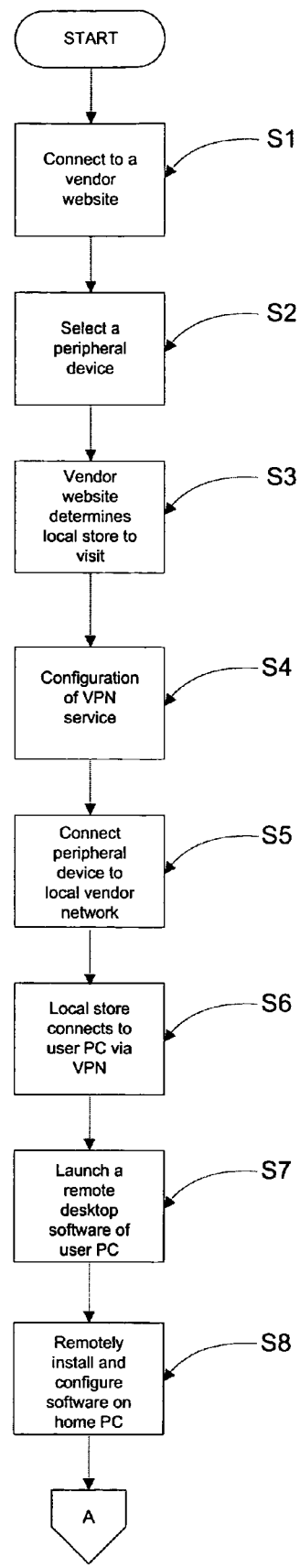
FIGS. 2A and 2B are a flowchart describing the preferred embodiment of remotely installing and configuring software for a peripheral device.
Figure 2B:
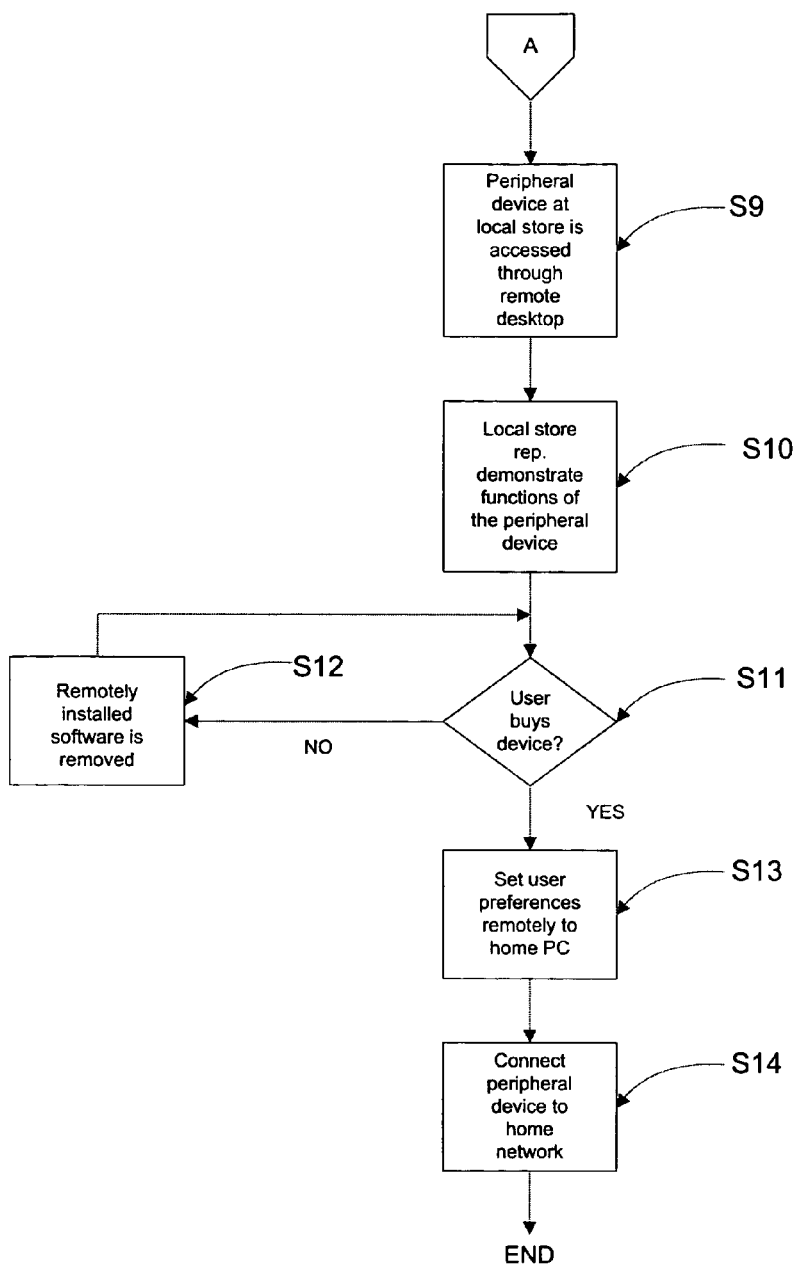

FIGS. 2A and 2B depict a flowchart describing the preferred embodiment of remotely installing and configuring software for a peripheral device. The steps include establishing a VPN connection between a client device and a vendor computer, using a remote desktop software application to install and configure software for a peripheral device located at the vendor's location on the client device, where upon physically connecting the peripheral device to the client device, requires no further installations or configurations.

In more detail, in step SI, the user connects client device 10 to a vendor's website through the Internet 16 via a general web browser. Next, in step S2, the user selects a peripheral device from a list of peripheral devices on the vendor's website.

In step S3, the vendor's website determines, via a database or any other similar means, whether the peripheral device selected in step S2 is in stock in one of the vendor's stores located locally to the client device. Once a determination is made that a local store has the selected peripheral device in stock, the client device is notified of the store's location with respect to the client device's location. Then in step S4, a web service from the vendor's website configures the client device 10 for a temporary VPN service to enable a connection with network 18.

In step S5, the user visits the local vendor, where one of the vendor's computer technicians connects the selected peripheral device to network 18. Then, in step S6, the vendor's computer 17 establishes a connection with the client device 10 via the VPN connection 14, 15.

Next, in step S7, a remote desktop software application is initiated on the local vendor's computer 17, and the local vendor's computer technician proceeds to log onto the client device 10 via the application, giving control over the client device 10 to the local vendor's computer technician. In step S8, software for the peripheral device is remotely installed and configured onto the client device 10 using the remote desktop software application via the VPN connection 14, 15.

In step S9, the selected peripheral device connected on the local vendor network is accessed through the remote desktop software application by the client device 10. Next, in step S10, the local vendor's computer technician demonstrates the functionality of the selected peripheral device by operating the peripheral device via the client device 10.

Turning to step S11, the user, based on the demonstration of the selected peripheral device's operation in conjunction with the client device 10, decides whether or not to purchase the selected peripheral device. If the user decides not to purchase the selected peripheral device, the process proceeds to step S12 where the remotely installed software on the client device 10 is remotely uninstalled. Otherwise, if the user proceeds with the purchase of the selected peripheral device, flow continues to step S13.

In step S13, the computer technician helps the user remotely configure the selected peripheral device to the user's preferences. For example, the user desires the user's printing device to print documents at medium quality with a specific paper format. These settings can be configured before the user departs the local vendor. Then, in step S14, the user, after returning home with the newly purchased peripheral device, connects the peripheral device to client device 10, foregoing installation and configuration of the peripheral device's software.

Figure 3:
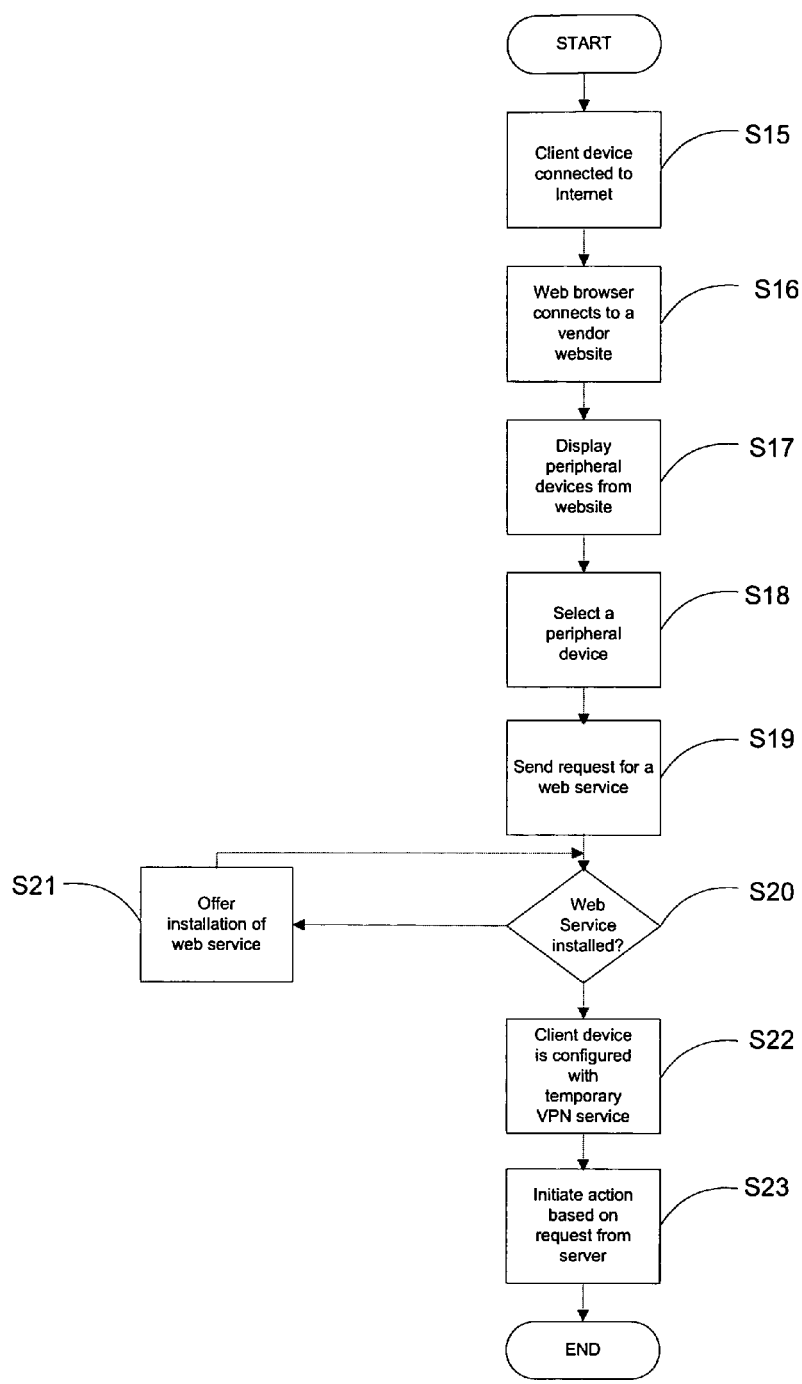
FIG. 3 is a flowchart describing the preferred embodiment of the client process of the present invention.

FIG. 3 is a flowchart describing the preferred embodiment of the client process of the present invention. The steps include initiating a web browser on the client device 10, connecting to a vendor's website, displaying peripheral devices from the vendor's website, selecting a peripheral device, and installing and configuring a temporary VPN service.

In more detail, in step S15 the client device 10 is connected to the Internet 16 via a web browser. Next, in step S16, client device 10 connects, using the web browser, to a vendor's website, and then in step S17, client device displays peripheral devices offered by the vendor.

In step S18, the user selects a peripheral device from the vendor's website, where upon selection of the peripheral device initiates the client device 10 to send a request to the local vendor's server 23 for a web service that configures the client device 10 for a secure temporary VPN service to enable a connection with network 18. If, in step S20, the client device 10 does not have the web service installed, the local vendor's server 23 offers the installation and configuration of the web service in step S21.

If, in step S20, the web service is installed on the client device 10, then, in step S22, the client device 10 has a temporary VPN service configured to establish a secure connection with network 18. Then, in step S23, the client device 10 initiates an action based on request from the server 23. For example, a remote desktop software application configured on the client device 10 enables the server 23 to control over client device 10 to process various requests such as installation of drivers.

Figure 4:
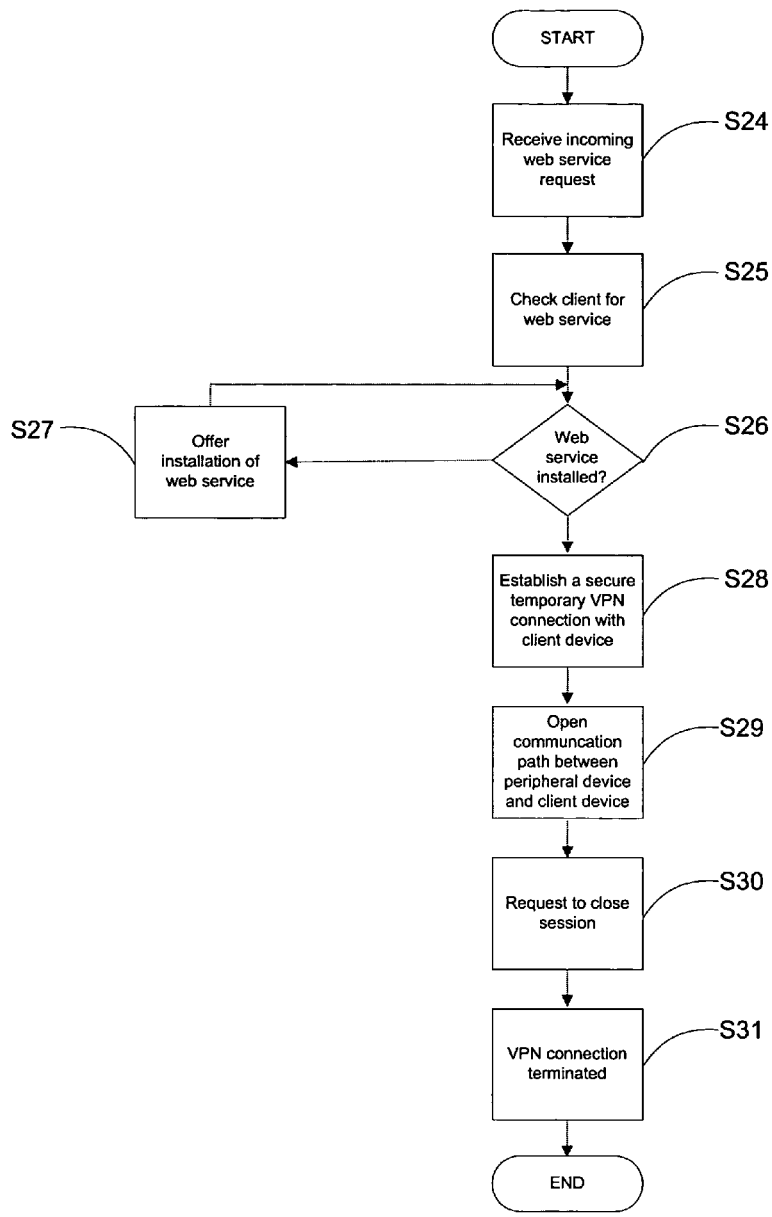
FIG. 4 is a flowchart describing the preferred embodiment of the server process of the present invention.

FIG. 4 is a flowchart describing the preferred embodiment of the server process of the present invention. The steps include receiving web service request, checking the client device 10 for the web service, offering an installation of the web service, establishing a secure temporary VPN connection with the client device 10, opening a communication path, receiving a request to close the current session, and terminating the temporary VPN connection.

In more detail, in step S24, the local vendor's server 23 receives a web service request from a client device 10. The web service configures the client device 10 for a secure temporary VPN service to enable a connection with network 18. Next, in step S25, the server 23 checks the client device 10 for the web service. If, in step S26, it is determined that no web service is installed on client device 10, the process proceeds to step S27 where the server 23 offers client device 10 installation of the web service.

If, in step S26, it is determined that web service is installed on client device 10, then flow proceeds to step S28, where the server 23 establishes a secure temporary VPN connection with client device 10. Next, in step S29, the server 23 opens a communication path between client device 10 and the peripheral device 19 located at the local vendor, whereby using a remote desktop software, the server is able to install and configure drivers or software for the peripheral device 19 onto client device 10. Following completion of the installation process of step S29, in step S30, a request to close the session is made by the server 23 or client device 10. Upon receipt of the request to close the session, the secure temporary VPN connection is terminated as in step S31.

In another embodiment, a user connects client device 10 to a vendor's website through the Internet 16 via a general web browser. The user, without selecting a particular peripheral device, proceeds to install a web service from the vendor's website to configure the client device 10 for a temporary VPN service to enable a connection with network 18. The user then visits a physical location of the vendor, where one of the vendor's computer technicians connects any peripheral device in stock to network 18. Then, the local vendor's computer 17 establishes a connection with the client device 10 via the VPN connection 14, 15, and a remote desktop software is initiated to log onto the client device 10, giving control over the client device 10 to the local vendor's computer technician. The local vendor's computer technician is then able to demonstrate the functionality of the connected peripheral device to the user by remotely installing and configuring client device 10 with software for the peripheral device. The user decides whether to purchase the connected peripheral device or to view demonstrations of other peripheral devices. If the user decides to purchase the peripheral device, the user returns home with the peripheral device, connects the peripheral device to client device 10, foregoing installation and configuration of the peripheral device's software.

While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A method for remotely installing and configuring software, comprising the steps of:
   connecting to an Internet site via a client device;
   selecting an item displayed on the Internet site;
   providing at least one location where the item can be obtained, wherein the at least one location is remote from the client device's location and the item is situated at the at least one location;
   establishing a temporary secure connection between the client device and the at least one location;
   installing and configuring software on the client device from the least one location via the temporary secure connection;
   controlling the item from the at least one location via the software installed and configured on the client device.

2. A method according to claim 1, wherein the item is a peripheral device.

3. A method according to claim 1, wherein the Internet site is a vendor's Internet site.

4. A method according to claim 3, wherein the at least one location is a physical location of the vendor.

5. A method according to claim 1, wherein the temporary secure connection is a virtual private network.

6. A method according to claim 1, wherein the software is installed and configured using a remote desktop software application.

7. A system for remotely installing and configuring software, comprising:
   connecting means for connecting to an Internet site via a client device;
   selecting means for selecting an item displayed on the Internet site;
   providing means for providing at least one location where the item can be obtained, wherein the at least one location is remote from the client device's location and the item is situated at the at least one location;
   establishing means for establishing a temporary secure connection between the client device and the at least one location;
   installing and configuring means for installing and configuring software on the client device from the least one location via the temporary secure connection;
   controlling means for controlling the item from the at least one location via the software installed and configured on the client device.

8. A system according to claim 7, wherein the item is a peripheral device.

9. A system according to claim 7, wherein the Internet site is a vendor's Internet site.

10. A system according to claim 9, wherein the at least one location is a physical location of the vendor.

11. A system according to claim 7, wherein the temporary secure connection is a virtual private network.

12. A system according to claim 7, wherein the software is installed and configured using a remote desktop software application.

13. Computer-executable process steps stored on a computer-readable medium, the computer-executable process steps to remotely install and configure software, said computer-executable process steps comprising:
   code to connect to an Internet site via a client device;
   code to select an item displayed on the Internet site;
   code to provide at least one location where the item can be obtained, wherein the at least one location is remote from the client device's location and the item is situated at the at least one location;

code to establish a temporary connection between the client device and the at least one location;

code to install and configure software on the client device from the at least one location via the temporary secure connection; and code to control the item from the at least one location via the software installed and configured on the client device.

14. Computer-executable process steps according to claim 13, wherein the item is a peripheral device.

15. Computer-executable process steps according to claim 13, wherein the Internet site is a vendor's Internet site.

16. Computer-executable process steps according to claim 13, wherein the temporary secure connection is a virtual private network.

17. A computer-readable memory medium which stores computer-executable process steps, the computer-executable process steps for remotely installing and configuring software, said computer-executable process steps comprising:

a connecting step to connect an Internet site via a client device;

a selecting step to select an item displayed on the Internet site;

a providing step to provide at least one location where the item can be obtained, wherein the at least one location is remote from the client device's location and the item is situated at the at least one location;

an establishing step to establish a temporary connection between the client device and the at least one location;

an installing and configuring step to install and configure software on the client device from the at least one location via the temporary secure connection; and a controlling step to control the item from the at least one location via the software installed and configured on the client device.

18. Computer-executable process steps according to claim 17, wherein the item is a peripheral device.

19. Computer-executable process steps according to claim 17, wherein the Internet site is a vendor's Internet site.

20. Computer-executable process steps according to claim 17, wherein the temporary secure connection is a virtual private network.

* * * * *